United States Patent
Bjornsson et al.

(10) Patent No.: US 7,617,372 B1
(45) Date of Patent: Nov. 10, 2009

(54) AVOIDING COPY ON FIRST WRITE

(75) Inventors: Magnus E. Bjornsson, West Newton, MA (US); Rong Yu, Franklin, MA (US); Haim Kopylovitz, Herzliya (IL); David Meiri, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 391 days.

(21) Appl. No.: 11/528,767

(22) Filed: Sep. 28, 2006

(51) Int. Cl.
*G06F 12/00* (2006.01)

(52) U.S. Cl. .................. 711/167; 711/144; 711/156; 707/204

(58) Field of Classification Search .................. 711/167, 711/144, 156; 707/204
See application file for complete search history.

(56) References Cited

U.S. PATENT DOCUMENTS

| | | | |
|---|---|---|---|
| 5,206,939 A | 4/1993 | Yanai et al. ..................... 711/4 |
| 5,778,394 A | 7/1998 | Galtzur et al. .............. 707/205 |
| 5,845,147 A | 12/1998 | Vishlitzky et al. .............. 710/5 |
| 5,857,208 A | 1/1999 | Ofek .......................... 707/204 |
| 7,155,586 B1 * | 12/2006 | Wagner et al. ............. 711/162 |
| 7,159,085 B2 * | 1/2007 | Wagner et al. ............. 711/162 |
| 7,299,332 B1 * | 11/2007 | Misra et al. ................. 711/170 |
| 7,315,914 B1 * | 1/2008 | Venkatanarayanan et al. ......................... 710/316 |
| 7,370,235 B1 * | 5/2008 | Gulve et al. ................... 714/20 |
| 7,401,251 B1 * | 7/2008 | Haynes et al. ................. 714/5 |
| 2003/0195886 A1 | 10/2003 | Vishlitzky et al. ............. 707/10 |
| 2008/0028167 A1 * | 1/2008 | Sharma et al. .............. 711/156 |

OTHER PUBLICATIONS

U.S. Appl. No. 11/324,766, filed Jan. 3, 2006, Meiri, et al.
U.S. Appl. No. 11/324,747, filed Jan. 3, 2006, Meiri, et al.
U.S. Appl. No. 11/325,078, filed Jan. 3, 2006, Meiri, et al.

* cited by examiner

*Primary Examiner*—Stephen C Elmore
(74) *Attorney, Agent, or Firm*—Muirhead and Saturnelli, LLC

(57) ABSTRACT

Handling a write operation to write data to a section of a storage device includes determining if the section needs to be copied to at least a first target device and, if the section of the storage device needs to be copied to the at least first target device, providing the data to a memory location and confirming completion of the write operation prior to copying the section of the storage device to the at least first target device. Handling a write operation to write data to a section of a storage device may also include determining if a slot in a cache memory corresponding to the section of the storage device needs to be copied to at least a second target device. If so, then in some cases the slot may be copied to the at least second target device prior to providing the data to the memory location.

20 Claims, 16 Drawing Sheets

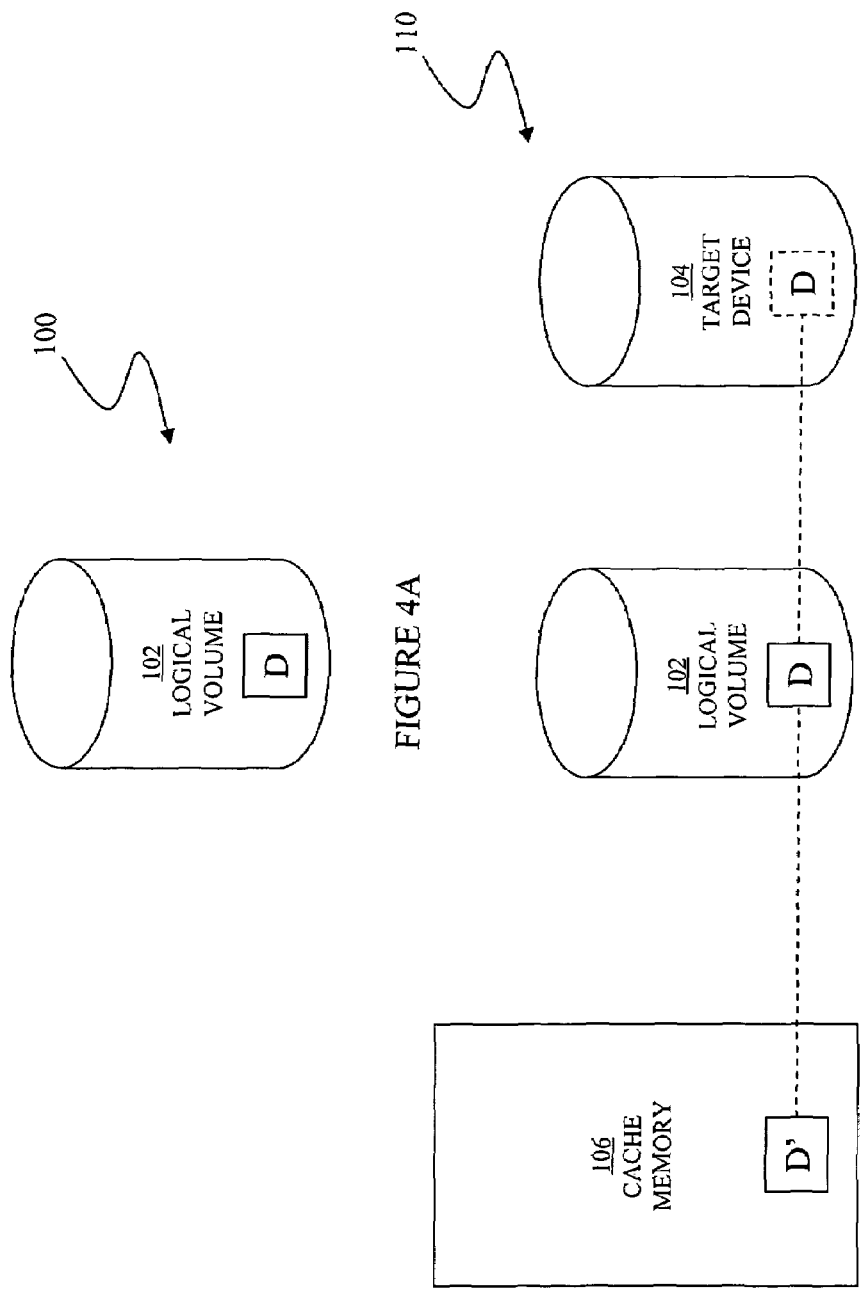

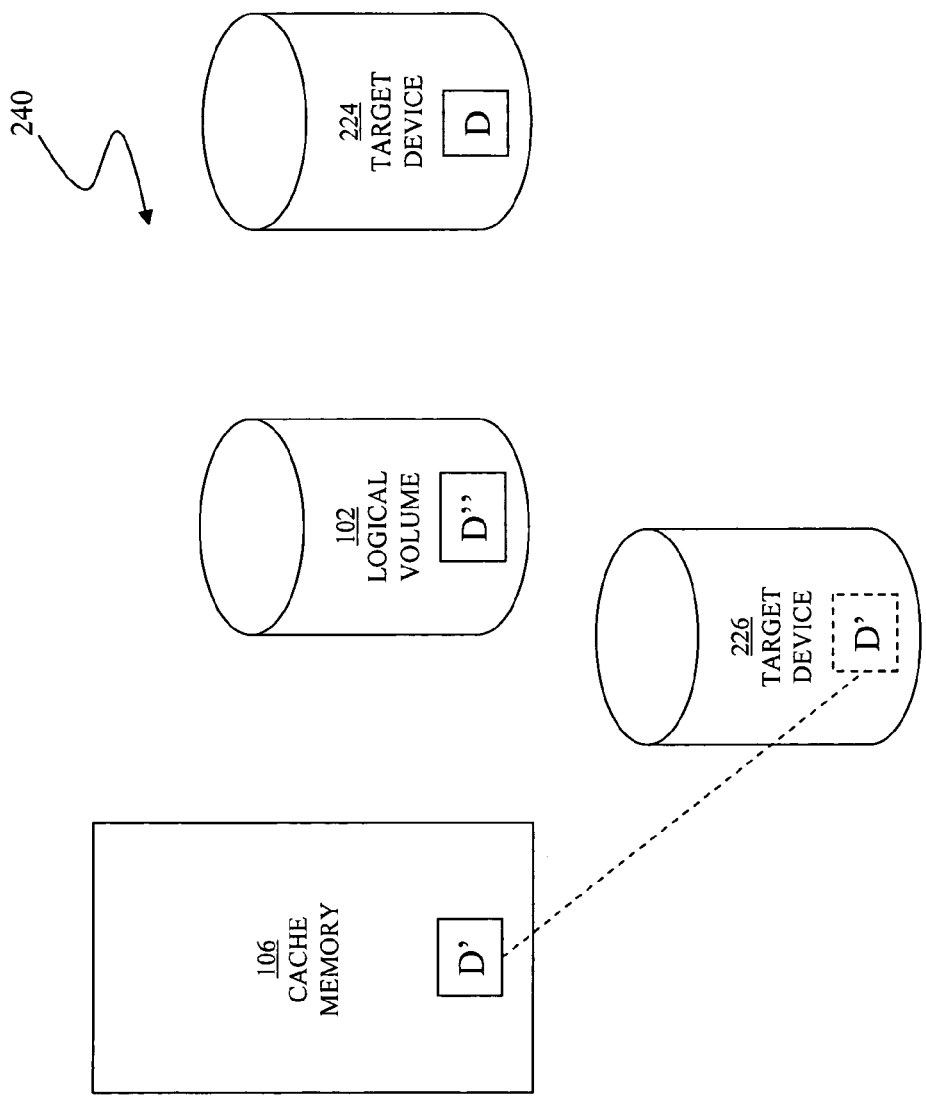

AVOIDING COPY ON FIRST WRITE

BACKGROUND OF THE INVENTION

1. Technical Field

This application relates to computing devices, and more particularly to the field of managing storage for computing devices.

2. Description of Related Art

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

It is desirable to be able to quickly get a consistent snapshot of data of a logical volume. Snapshot functionality may be provided on a storage device using protection bits to indicate when a track needs to be copied to a target for the snapshot. A session corresponding to the protection bit may be established so that when a protection bit is set, a write operation to a track of the storage device is intercepted before the write operation modifies the track. The track is first copied to the target(s) of the snapshot before the write operation continues. Such a copy is called "copy-on-first-write" (COFW). After the copy to the target has taken place, the protection bit is cleared so that subsequent writes do not need to be intercepted in the same manner.

The impact of COFW to the response time may be substantial since the write operation to the storage device is paused until the copy to the target is complete. Accordingly, it is desirable to improve the response time of the first write operation to a track of a storage device after a snapshot (or similar) operation is initiated for the storage device.

SUMMARY OF THE INVENTION

According to the present invention, handling a write operation to write data to a section of a storage device includes determining if the section needs to be copied to at least a first target device and, if the section of the storage device needs to be copied to the at least first target device, providing the data to a memory location and confirming completion of the write operation prior to copying the section of the storage device to the at least first target device. The memory location may be a cache memory. Handling a write operation to write data to a section of a storage device may also include determining if a slot in a cache memory corresponding to the section of the storage device needs to be copied to at least a second target device. In response to the section of the storage device needing to be copied to the at least first target device and the slot needing to be copied to the at least second target device, the slot may be copied to the at least second target device prior to providing the data to the memory location. Handling a write operation to write data to a section of a storage device may also include establishing a first session corresponding to the first target device and establishing a second session corresponding to the second target device. Handling a write operation to write data to a section of a storage device may also include associating each of the sessions with a counter indicating a number of sessions that have been established. Determining if a slot in the cache memory corresponds to the section of the storage device that needs to be copied to at least a second target device may include examining the counters associated with each of the sessions. Examining the counters may include determining if a counter associated with a session is less than a counter associated with a slot. The counter associated with the slot may be a value for the number of sessions that had been established when the data was written to the slot.

According further to the present invention, computer software, provided in a computer-readable storage medium, that handles a write operation to write data to a section of a storage device, includes executable code that determines if the section needs to be copied to at least a first target device and executable code that provides the data to a memory location and confirms completion of the write operation prior to copying the section of the storage device to the at least first target device if the section of the storage device needs to be copied to the at least first target device. The memory location may be a cache memory. The computer software may include executable code that determines if a slot in a cache memory corresponding to the section of the storage device needs to be copied to at least a second target device. In response to the section of the storage device needing to be copied to the at least first target device and the slot needing to be copied to the at least second target device, the slot may be copied to the at least second target device prior to providing the data to the memory location. The computer software may also include executable code that establishes a first session corresponding to the first target device, executable code that establishes a second session corresponding to the second target device, and executable code that associates each of the sessions with a counter indicating a number of sessions that have been established.

According further to the present invention, a storage device includes a plurality of interconnected directors, at least some of which provide input and output for the storage device, a plurality of disks, coupled to at least some of the directors, the disks containing data for the storage device, and a computer-readable storage medium containing software that handles a write operation to write data to a section of a storage device, the software having executable code that determines if the section needs to be copied to at least a first target device and executable code that provides the data to a memory location and confirms completion of the write operation prior to copying the section of the storage device to the at least first target device if the section of the storage device needs to be copied to the at least first target device. The memory location may be a cache memory. The software may also includes executable code that determines if a slot in a cache memory corresponding to the section of the storage device needs to be copied to at least a second target device. In response to the section of the storage device needing to be copied to the at least first target device and the slot needing to be copied to the at least second target device, the slot may be copied to the at least second target device prior to providing the data to the memory location. The software may also include executable code that establishes a first session corresponding to the first target device and executable code that establishes a second session corresponding to the second target device. The software may also include executable code that associates each of the sessions with a counter indicating a number of sessions that have been established.

BRIEF DESCRIPTION OF DRAWINGS

FIGS. 4A-4D are diagrams illustrating handling write operations according to the system described herein when there is at least one session established to a logical volume of a storage device.

FIGS. 6A-6D are diagrams illustrating handling write operations according to the system described herein when there are multiple sessions established to a logical volume of a storage device.

DETAILED DESCRIPTION OF VARIOUS EMBODIMENTS

Figure 1:
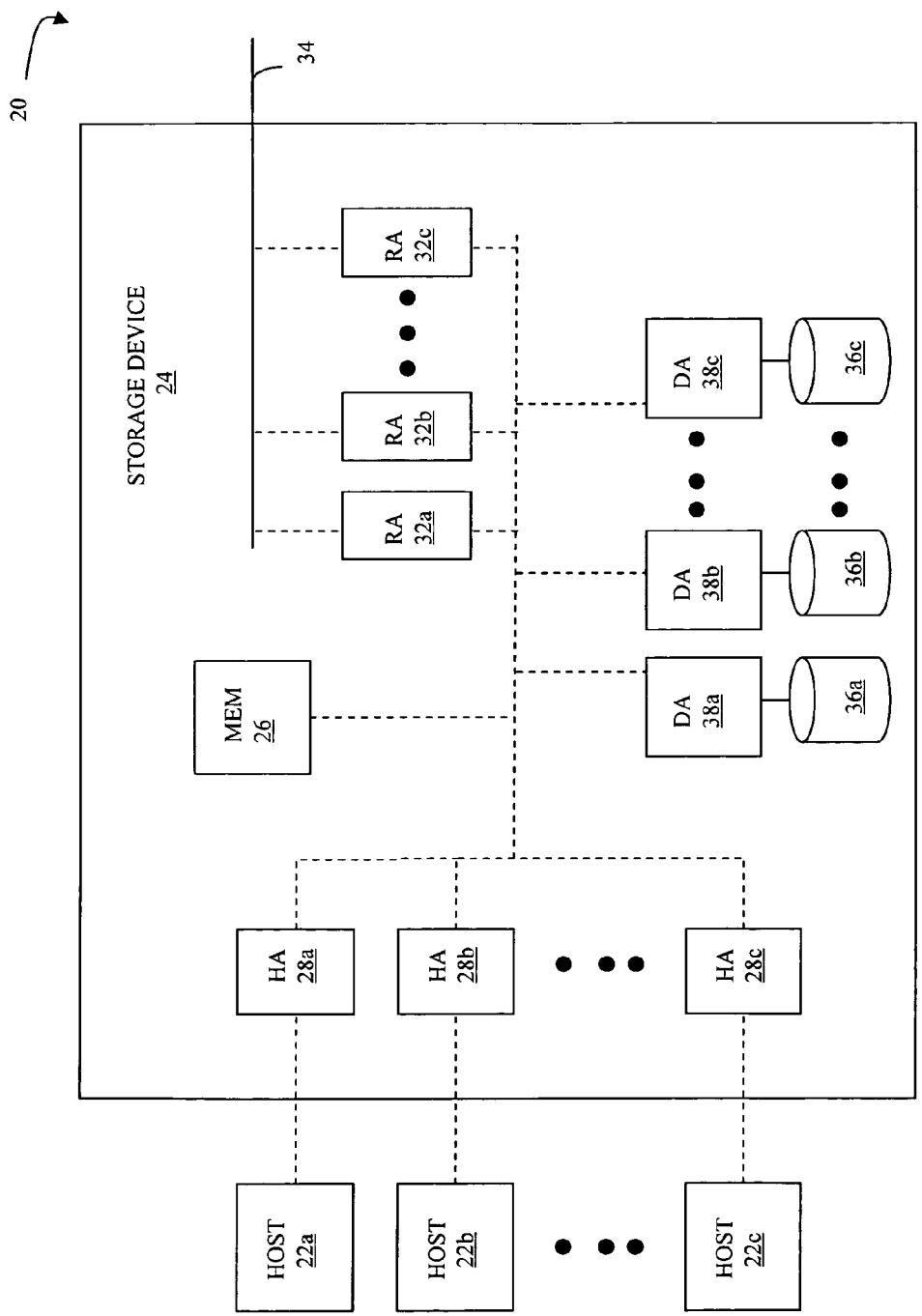
FIG. 1 is a diagram showing a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device 24 also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown in FIG. 1) that are also coupled to the RDF link 34. The storage device 24 may be coupled to addition RDF links (not shown in FIG. 1) in addition to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of logical volumes or devices. The logical volumes may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the actual correspondence between the logical devices and the disks 36a-36c. Logical devices that correspond to physical storage space on the disks 36a-36c may also be referred to as "standard logical devices".

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks or requests that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device 24 may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
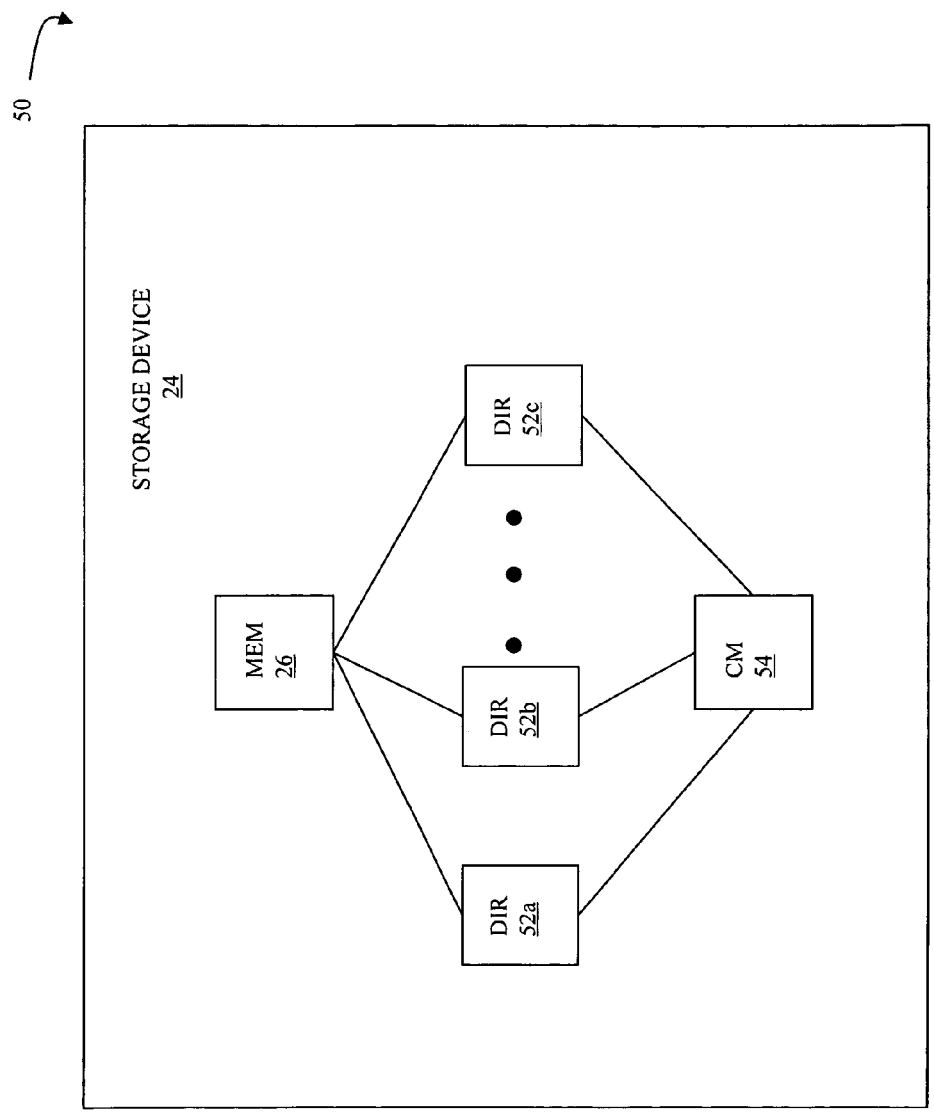
FIG. 2 is a diagram showing a storage device, memory, a plurality of directors, and a communication module according to the system described herein.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixtyfour directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at one types of director and perform other processing with the other processing system.

Figure 3:
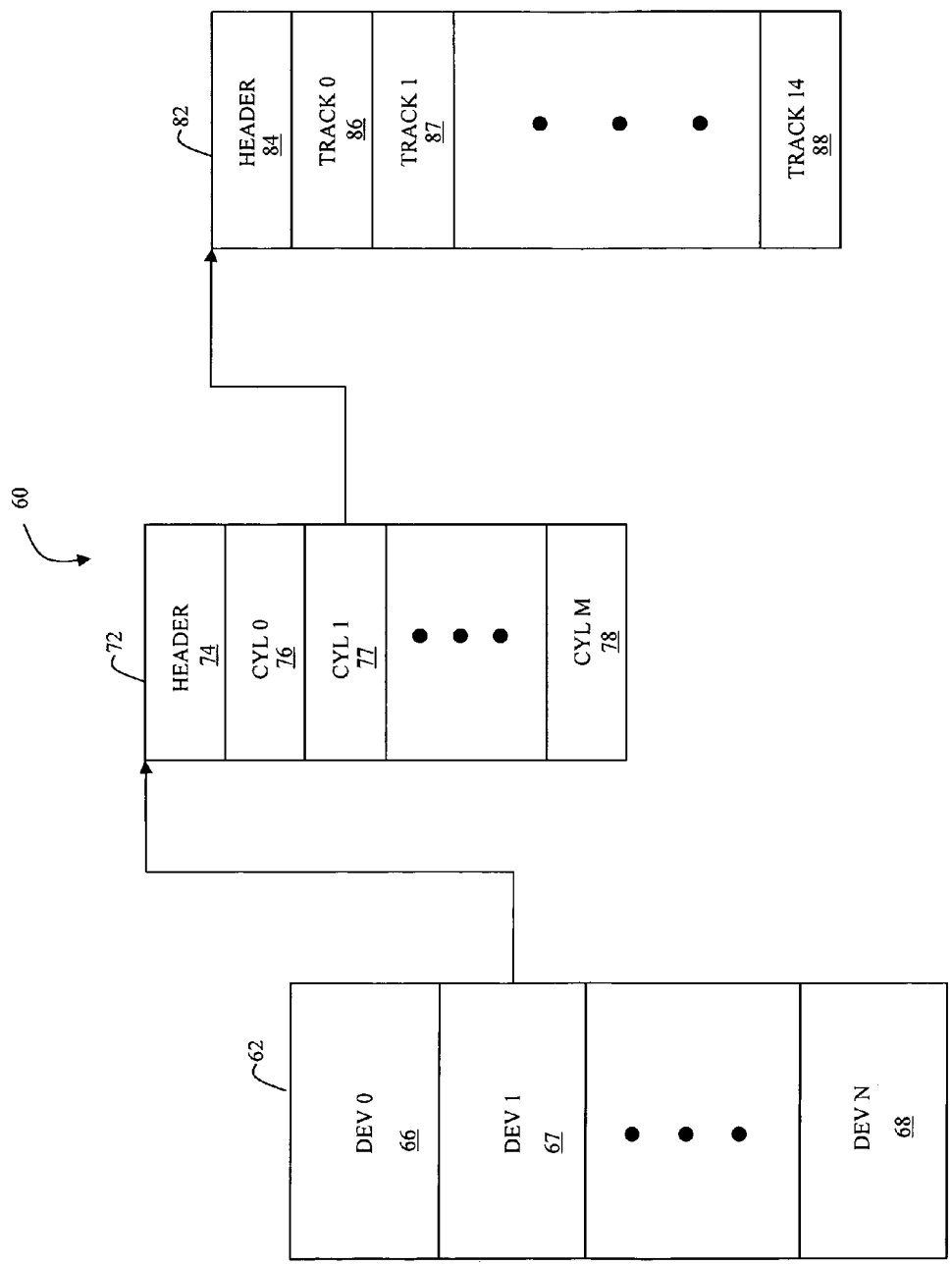
FIG. 3 is a diagram showing device tables used in connection with the system described herein.

Referring to FIG. 3, a diagram 60 illustrates tables that are used to keep track of device information. A first table 62 corresponds to all of the devices used by the storage device 24 or by an element of a storage device, such as an HA and/or a DA. The table 62 includes a plurality of logical device entries 66-68 that correspond to all the logical devices used by the storage device (or portion of the storage device). The entries in the table 62 include descriptions for standard logical devices, virtual devices, log devices, and other types of logical devices.

Each of the entries 66-68 of the table 62 correspond to another table that contains information for each of the logical devices. For example, the entry 67 may correspond to a table 72. The table 72 includes a header that contains overhead information. The table 72 also includes entries 76-78 for each of the cylinders of the logical device. In an embodiment disclosed herein, a logical device may contain any number of cylinders depending upon how the logical device is initialized. However, in other embodiments, a logical device may contain a fixed number of cylinders.

Each of the cylinder entries 76-78 corresponds to a track table. For example, the entry 77 may correspond to a track table 82 that includes a header 84 having overhead information. The track table 82 also includes entries 86-88 for each of the tracks. In an embodiment disclosed herein, there are fifteen tracks for every cylinder. However, for other embodiments, it may be possible to have different numbers of tracks for each of the cylinders or even a variable number of tracks for each cylinder. For standard logical devices, the information in each of the entries 86-88 includes a pointer (either direct or indirect) to the physical address on one of the disk drives 36a-36c of the storage device 24 (or a remote storage device if the system is so configured). Thus, the track table 82 may be used to map logical addresses of the logical device corresponding to the tables 62, 72, 82 to physical addresses on the disk drives 36a-36c of the storage device 24.

The tables 62, 72, 82 of FIG. 3 may be stored in the global memory 26 of the storage device 24. In addition, the tables corresponding to devices accessed by a particular host may be stored in local memory of the corresponding one of the HA's 28a-28c. In addition, the RA's 32a-32c and/or the DA's 38a-38c may also use and locally store portions of the tables 62, 72, 82.

A protection bit field may be associated with each of the track table entries 86-88. In an embodiment herein, the protection bit field has sixteen bits. Each of the bits, which may be set or cleared independently from each of the other bits, represents an independent session for intercepting write operations to the track of the standard logical device and performing special processing either prior to, or instead of, the write operation.

Although there are many potential uses for the session mechanism, the particular use relating to Copy on First Write (COFW) is discussed herein where one or more set protection set bits cause the first write to the track to be intercepted and the data from the track to be copied to a target volume prior to executing the write operation. The protection bit(s) may then be cleared so that subsequent writes to the track are not intercepted. Of course, since the sessions may be independent, it is possible to set a first group of protection bits, perform a COFW and clear the first group of protection bits, and then set a different group of protection bits for one or more new sessions that are established after the first COFW associated with the first group of protection bits.

Use of the COFW mechanism and protection bits is discussed, for example, in U.S. published patent application 20030195886 to Vishlitzsky, et al. titled "VIRTUAL STORAGE DEVICES", which is incorporated by reference herein. Each new virtual device that is established to a standard logical device may correspond to a different session that is established and to a different protection bit. Of course, there are other COFW applications besides virtual devices (e.g., SNAP copy). Note also that protection bits may have uses that are unrelated to COFW.

Referring to FIG. 4A, a diagram 100 shows a logical volume 102 having data, D, stored thereon. The data, D, may represent an initial version of data provided on a track or on multiple tracks. A session requiring a copy on first write may be established to the logical volume 102, in which case the data, D, is to be copied to a target device (e.g., another logical storage device) whenever a write operation is performed to the logical volume 102 that would cause the data, D (or a portion thereof), to be overwritten. The system described herein provides a mechanism to avoid having to perform the copy on first write operation at the time that data is initially written to the logical volume 102. Instead, the system herein allows the initial write operation to be completed prior to the data, D, being copied to the target device.

Referring to FIG. 4B, a diagram 110 shows the logical volume 102, a target device 104 corresponding to a copy on first write session established to the logical volume 102, and a cache memory 106 that may be provided in the global memory 26, described above, while the logical volume 102 and the target device 104 (and other target devices described herein) may be provided by the storage device 24. The cache memory 106 is shown as containing a new version of the data, D', that was written to the logical volume 102 to overwrite the earlier version of the data, D. In an embodiment herein, data written to the logical volume 102 is first provided to the cache memory 106 prior to being destaged to the disks 36a-36c of the storage device 24 that corresponds to the logical volume 102. In the diagram 110, the newer version of the data, D', has not yet been written to the logical volume 102. Thus, the logical volume 102 still contains the earlier version of the data, D.

The target device 104 does not yet contain the data, D, which is indicated by the dotted line used to draw the box for the data, D. In such a case, the data, D, is "owed" to the target device 104. Note therefore that the system maintains two versions of the data: an earlier version (D) maintained on the logical volume 102 and a newer version (D') maintained in the cache memory 106. Ultimately, the data, D', will be stored on the logical volume 102 and the data, D, will be stored on the target device 104. However, as described in more detail herein, it is possible to maintain the system in a state like that illustrated by the diagram 110 while allowing for completion of the write operation for the data, D'. As described in more detail elsewhere herein, the data, D, may be provided to the target device 104 after acknowledging the operation that wrote the data, D'. Thus, for example, a host may write the data, D', to the storage device 24 and receive an acknowledgment of that write operation (i.e., that the operation has completed) while the storage device 24 is in a state like that illustrated by the diagram 110. In such a case, the host will not need to wait for the storage device 24 to copy the data, D, to the target device 104 prior to receiving an acknowledgment of the write operation.

Figure 4C:
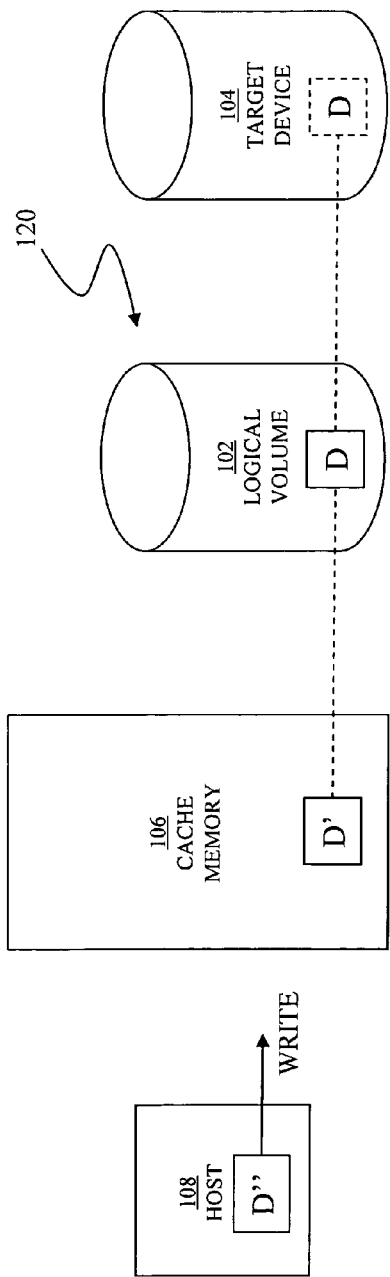

Referring to FIG. 4C, a diagram 120 illustrates a host 108 performing a write operation when the system is in a state like that illustrated by the diagram 110. The host 108 writes data, D", that is meant to overwrite the data, D, stored on the logical volume 102. As discussed in more detail elsewhere herein, special processing may be provided in situations where new sessions are established to the logical volume 102 while the system is in the state illustrated by the diagram 110. However, in the simple case where no new sessions have been established, there is no need to copy data to the target device 104 in response to the host 108 writing new data since the data, D, that is owed to the target device 104 is still maintained on the logical volume 102.

Figure 4D:
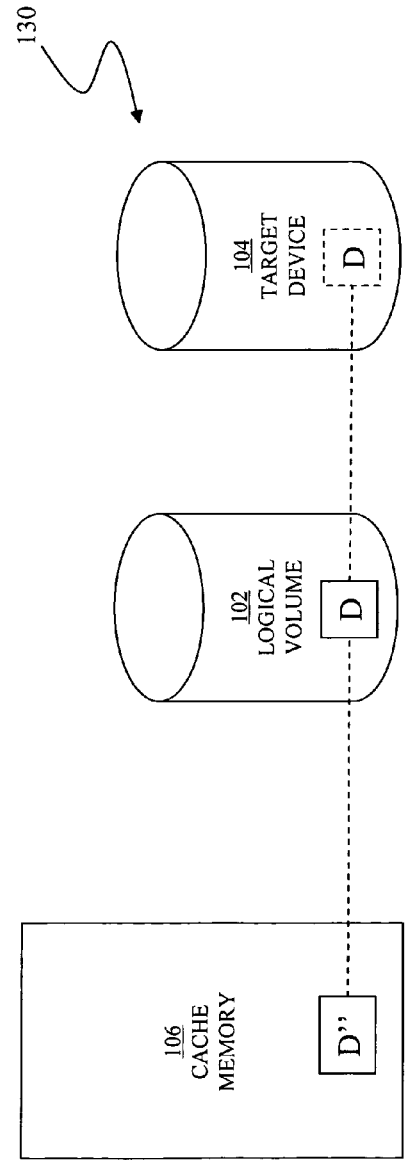

Referring to FIG. 4D, a diagram 130 illustrates the result of performing the write operation illustrated by the diagram 120. The data, D, is maintained on the logical volume 102 and is still owed to the target device 104. However, the cache memory 106 now contains the data, D", written by the host 108. Accordingly, the state of the system illustrated by the diagram 130 is very much like the state of the system illustrated by the diagram 110.

Figure 5:
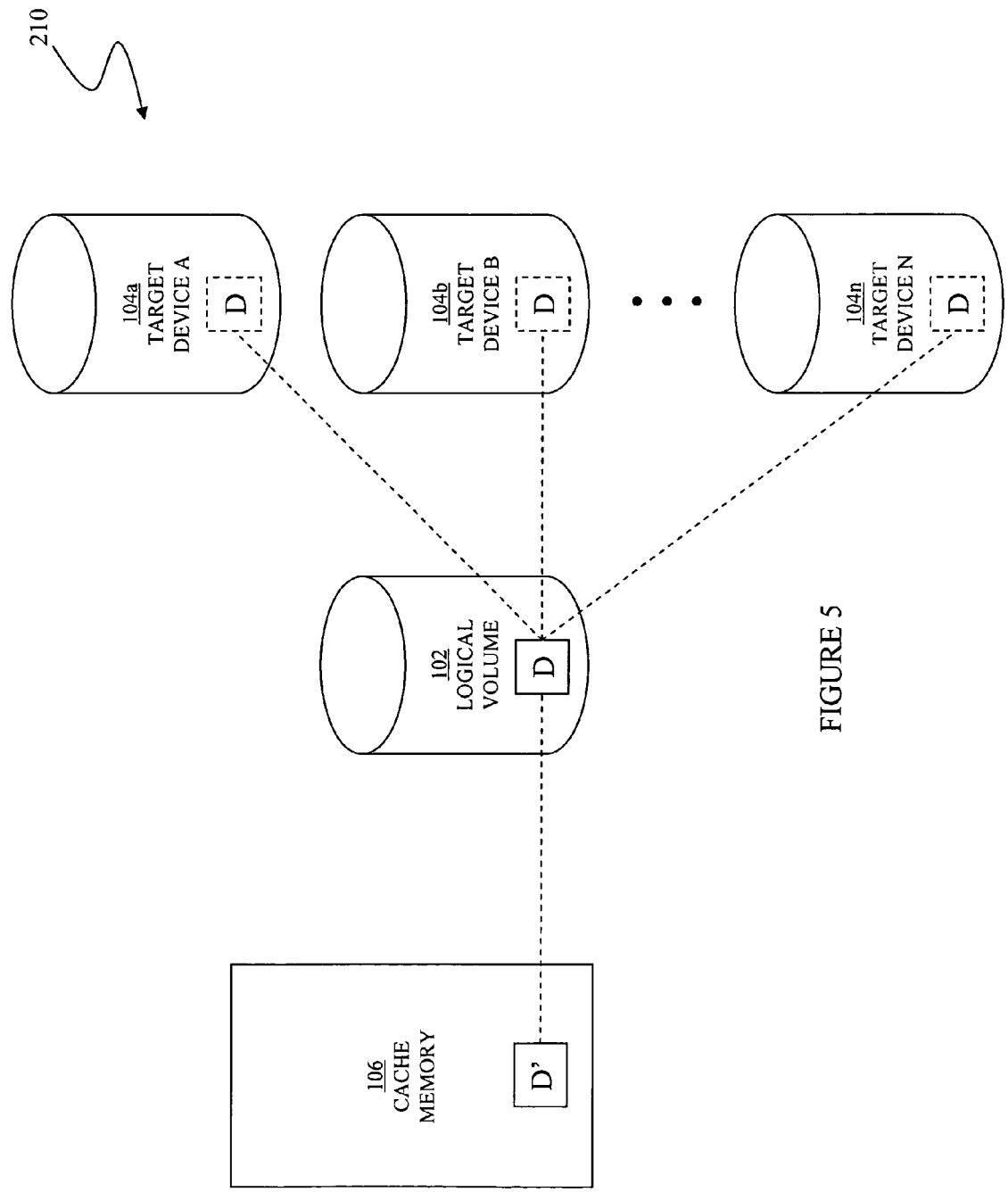
FIG. 5 is a diagram illustrating a storage device and multiple targets for one or more sessions established to a logical volume of a storage device according to the system described herein.

Referring to FIG. 5, a diagram 210 illustrates multiple sessions being established to the logical volume 102. A plurality of targets 104a-104c may correspond to the multiple sessions. Note that it is possible to have a single session correspond to more than one target and that it is also possible to have multiple sessions correspond to the same target.

Figure 6A:
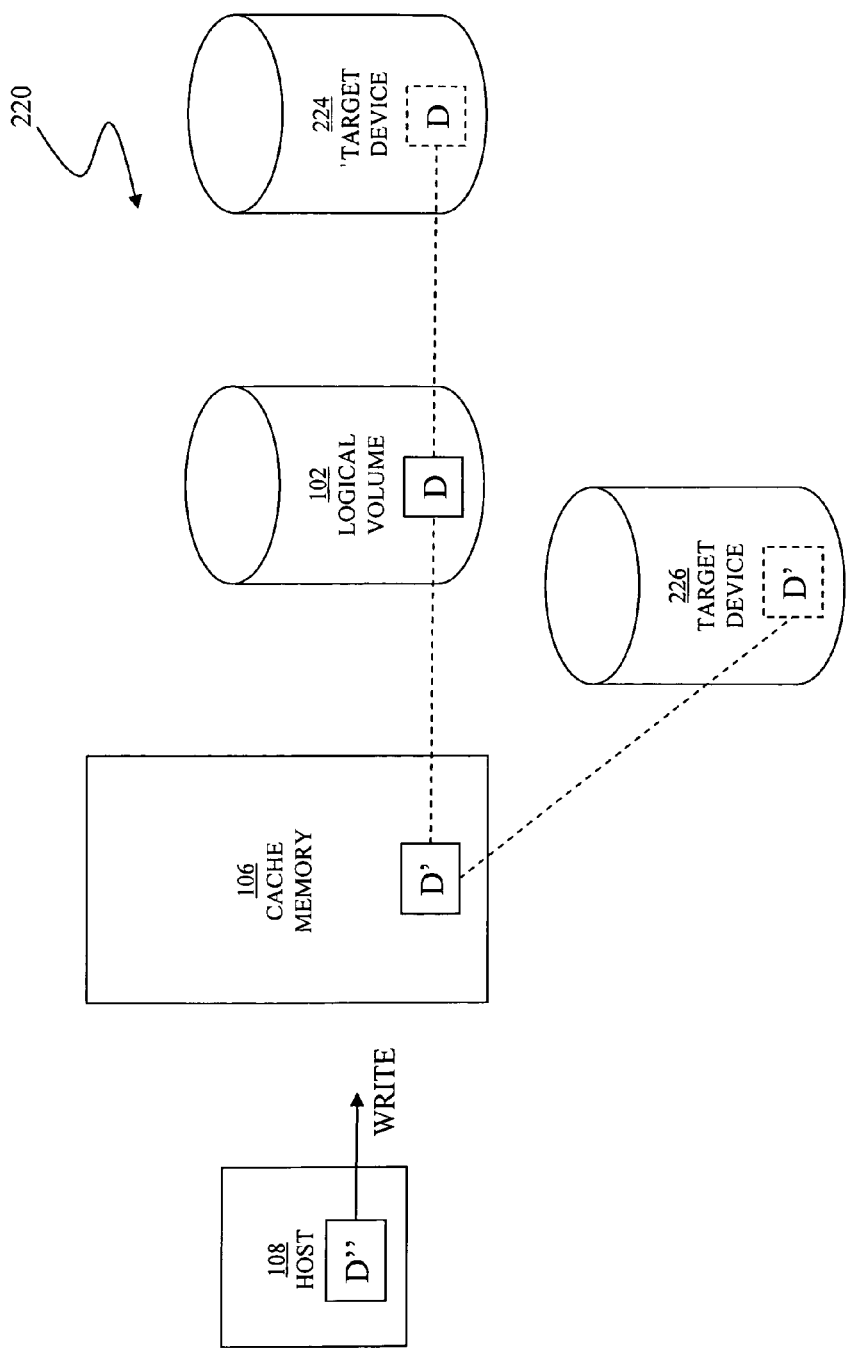

Referring to FIG. 6A, a diagram 220 illustrates the logical volume 102 having multiple sessions established thereto where one of the sessions corresponds to a first target device 224 and another one of the sessions corresponds to a second target device 226. The example illustrated by the diagram 220 assumes the following sequence of events: 1) a session corresponding to the first target device 224 is established to the logical volume 102; 2) a write operation is performed to write the data, D'; 3) another session, corresponding to the second target device 226, is established to the logical volume 102; and 4) a write operation is performed (by the host 108 in this example) to write new data, D". In such a case, it would not be appropriate to overwrite the data, D', stored in the cache memory 106, since the data, D', is owed to the second target device 226.

Figure 6B:
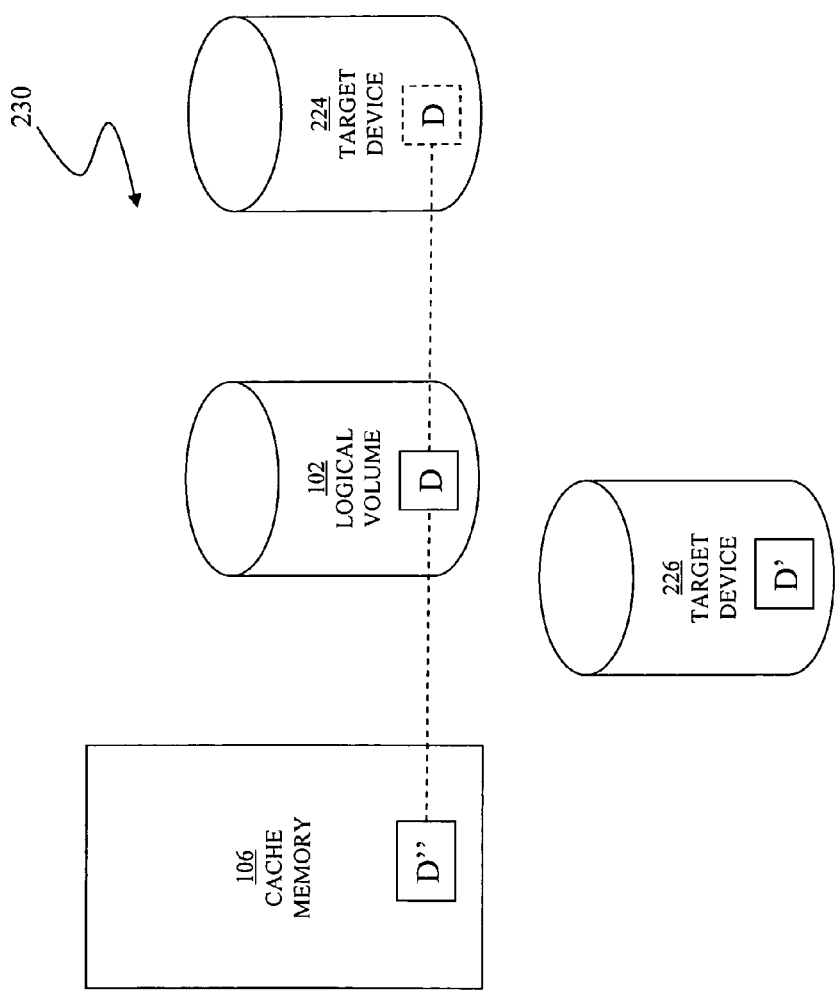

Referring to FIG. 6B, a diagram 230 shows one possibility for handling the write operation illustrated by the diagram 220 of FIG. 6A. Initially, the data, D', is written to the second target device 236. This may be performed by, for example, destaging the data, D', from the cache memory 106 to the second target device 226. Following this, the data, D", may be written to the cache memory 106. Note that the data, D, is still owed from the logical volume 102 to the first target device 224. However, if no new sessions are established, subsequent writes may simply overwrite the data, D", in the cache memory 106 once no data is owed to the second target device 226.

Referring to FIG. 6C, a diagram 240 illustrates an alternative for handling the write operation illustrated by the diagram 220 of FIG. 6A. The diagram 240 shows that the data, D, has been provided to the first target device 224. The data, D", may then be written directly to the logical volume 102. In an embodiment herein, the data, D", may be written to the logical volume 102 after copying the data, D", to a scratch slot in the cache memory 106 and then destaging the data from the cache memory 106 to the logical volume 102. In this case, the data, D', is still maintained in the cache memory 106 and is still owed to be second target device 226. A possible disadvantage of this embodiment is that the data, D', in the cache memory 106 is older than the corresponding data, D", in the logical volume 102.

Figure 6D:
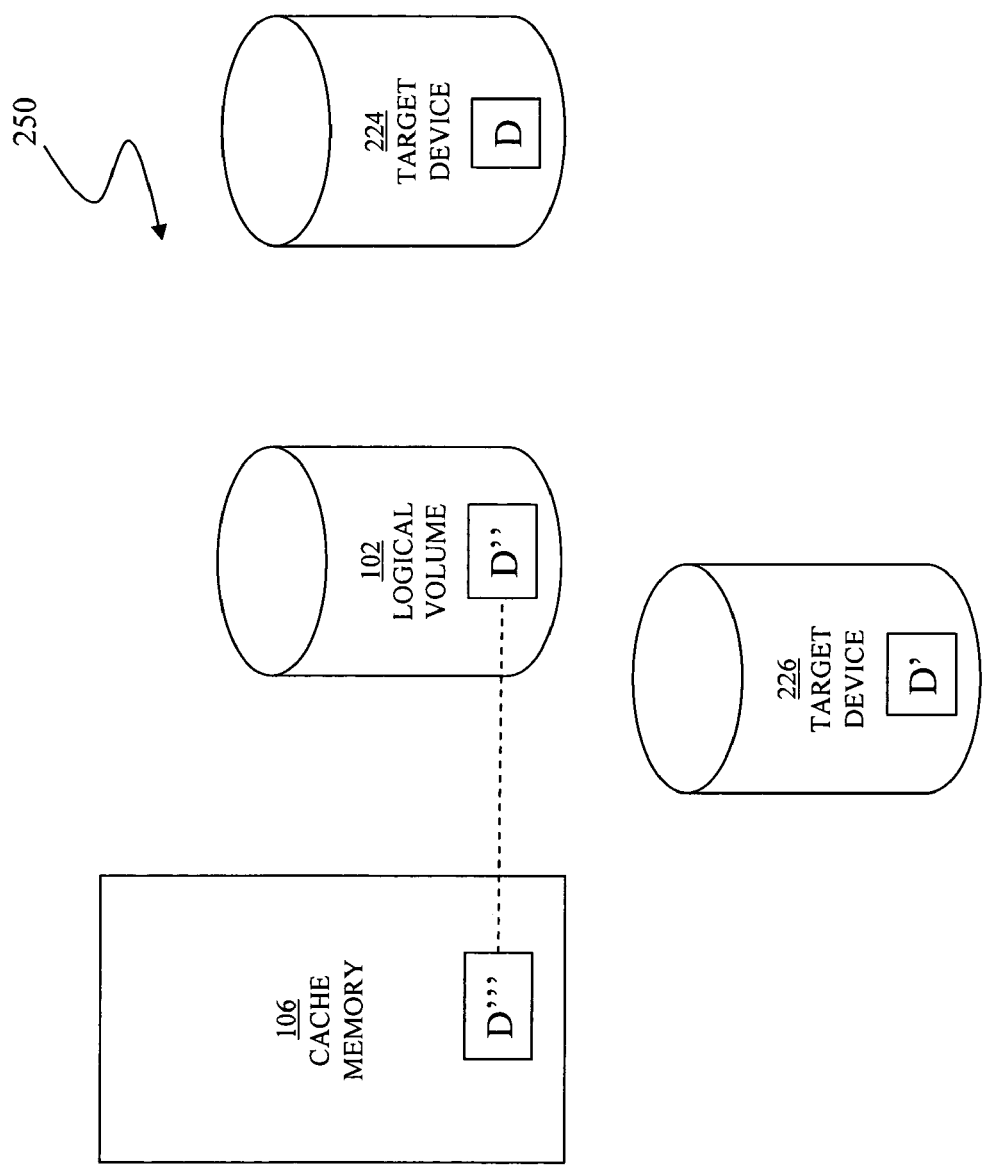

Referring to FIG. 6D, a diagram 250 illustrates handling a subsequent write operation for the system illustrated by the diagram 240 of FIG. 6C. The data, D", is first provided to the second storage device 226. Then, the data, D'", is written to the cache memory 106. Note that following these operations, neither of the first and second target devices 224, 226 are owed any data.

Figure 7:
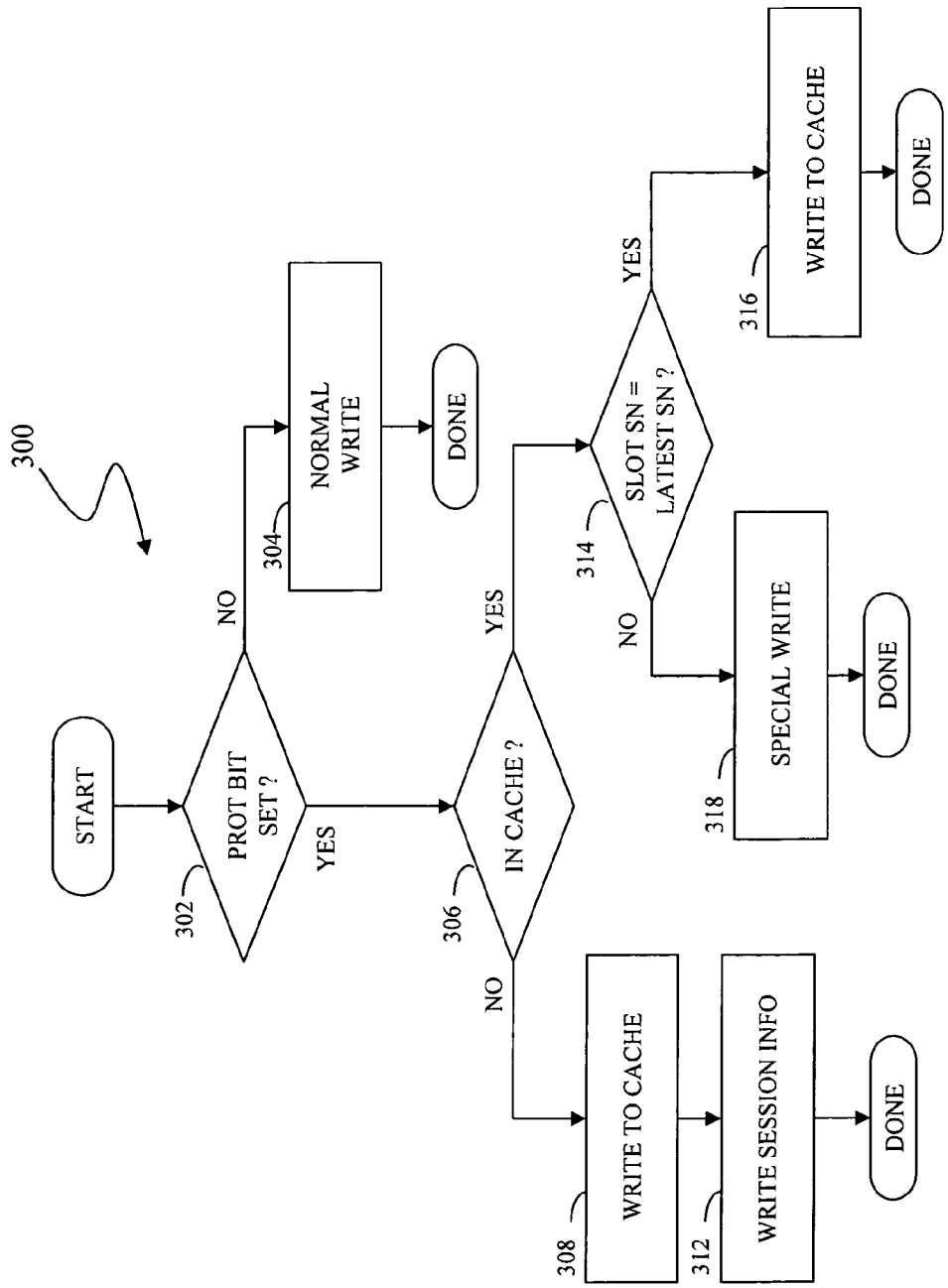
FIG. 7 is a flow chart illustrating steps in connection with a write operation according to the system described herein.

Referring to FIG. 7, a flow chart 300 illustrates steps performed in connection with a write operation according to the system described herein. Processing begins a first step 302 where it is determined if there are any protection bits set for the track to which the write operation is being performed. If not, then control transfers from the test step 302 to a step 304 where a normal write operation is performed. Following the step 304, processing is complete.

If it is determined at the test step 302 that at least one protection bit is set for the track to which the write operation is being performed, then control transfers from the test step 302 to a test step 306 where it is determined if data for the track to which the write operation is being performed is already in the cache memory 106. If not, then control transfers from the test step 306 to a step 308 where the data is written to the cache memory 106. Following the step 308 is a step 312 where additional information is added to the corresponding entry in the track table 82. The additional information may include a latest session number value that indicates the number of new sessions that have been established since the system was initialized. Thus, if twelve sessions had been established since the system was initialized, then the number twelve may be added to the entry in the track table 82 for the track to which the write operation is being performed. In other embodiments, the latest session number value may be added to the corresponding data in the cache memory 106. The latest session number value may be incremented each time a new session is established without ever being decremented. Following the step 312, processing is complete.

In some embodiments, the latest session number value may be initialized to zero prior to any sessions being established. In such a case, a normal write operation that is performed prior to any sessions being established may place the data that is written in the cache memory 106 in a conventional fashion and provide the additional information to the track table 82 and/or to the cache memory 106 indicating the latest session number value of zero.

If it is determined at the test step 306 that data for the track to which the write operation is being performed is already in the cache memory 106, then control transfers from the test step 306 to a test step 314 where it is determined if the latest session number value equals the session number value associated with the slot. As described elsewhere herein, the latest session number value is recorded in connection with the slot when the data for the slot is provided in the cache memory 106 (e.g., at the step 312). If it is determined at the test step 314 that the values are equal, then control transfers from the test step 314 to a step 316 where the data is written to the cache memory 106. Thus, the data that had been in the cache memory 106 is overwritten. Performing the write operation at the step 316 is like the scenario illustrated by the diagram 130 of FIG. 4D, discussed above. Following the step 316, processing is complete.

If it is determined at the test step 314 that the latest session number value does not equal the session number value associated with the slot, then control transfers from the test step 314 to a step 318 where special write processing is performed. Note that reaching the step 318 is like the scenario illustrated by the diagram 220 of FIG. 6A, discussed above. The special write processing performed at the step 318 results in a state like that illustrated in FIG. 6B or in FIG. 6C. Following the step 318, processing is complete.

Figure 8:
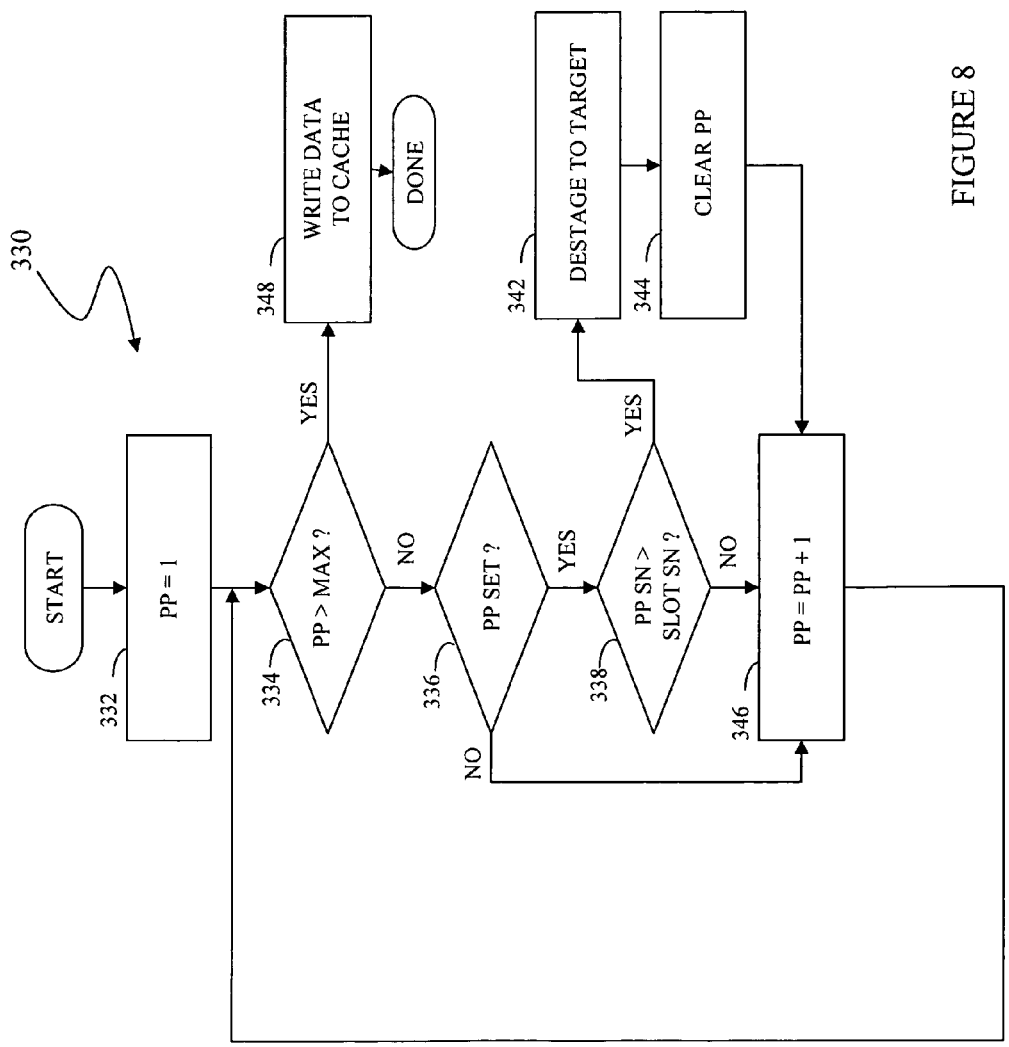
FIG. 8 is a flow chart illustrating steps in connection with handling a write operation after new sessions have been established according to the system described herein.

Referring to FIG. 8, a flow chart 330 illustrates steps performed in connection with the special write processing step 318 of the flow chart 300 of FIG. 7. Performing the steps illustrated by the flow chart 330 results of a system like that illustrated by the diagram 230 of FIG. 6B, discussed above.

Processing begins at a first step 332 where a pointer, PP, used to iterate through the protection bits (and corresponding sessions) for the track is initialized. Following the step 332 is a test step 334 where it is determined if PP is greater than the maximum value of PP, indicating that the processing has iterated through all of the protection bits. If not, then control transfers from the test step 334 to a test step 336 where it is determined if the protection bit corresponding to the value of PP is set. If so, then control transfers from the test step 336 to a test step 338 where it is determined if the session number value associated with PP is greater than the session number value associated with the slot in the cache memory 106.

In an embodiment herein, each time a new session is established, a session number value is associated with the new session where the session number value equals the latest session number value at the time that the new session is established. Thus, for example, if a new session is established when the latest session number value equals twelve, then the session number value associated with the new session is twelve. As discussed elsewhere herein, the latest session number value is incremented in response to establishing a new session. Note that the latest session number value is not decremented, even when sessions are removed (deestablished).

If it is determined at the test step 338 that the session number value associated with the protection bit pointed to by PP is greater than the session number value associated with the slot, then control transfers from the test step 338 to a step 342 where the slot is destaged from the cache memory 106 to the target device(s) for the session corresponding to PP. Following the step 342 is a step 344 where the protection bit corresponding to PP is cleared. Following the step 344 is a step 346 where the pointer, PP, used to iterate through the protection bits is incremented. Note that the step 346 is reached from the step 336 if the protection bit corresponding to PP is not determined to be set at the test step 336. The step 346 is also reached if the slot number value associated with the protection bit corresponding to PP is not greater than the session number value associated with the slot.

Following the step 346, control transfers back to the test step 334 where it is determined if all of the protection bits have been processed. If so, then control transfers from the test step 334 to a step 348 where the data that is being written (e.g., D" in FIGS. 6A and 6B) is provided to the cache memory 106. Although writing the data to the cache memory 106 at the step 348 overwrites the data already in the cache memory 106 (e.g., D' in FIGS. 6A and 6B), all targets that were owed the data, D', that was in the cache memory 106 prior to the write operation would have received the data in connection with execution of the step 342, discussed above. Following the step 348, processing is complete.

Figure 9:
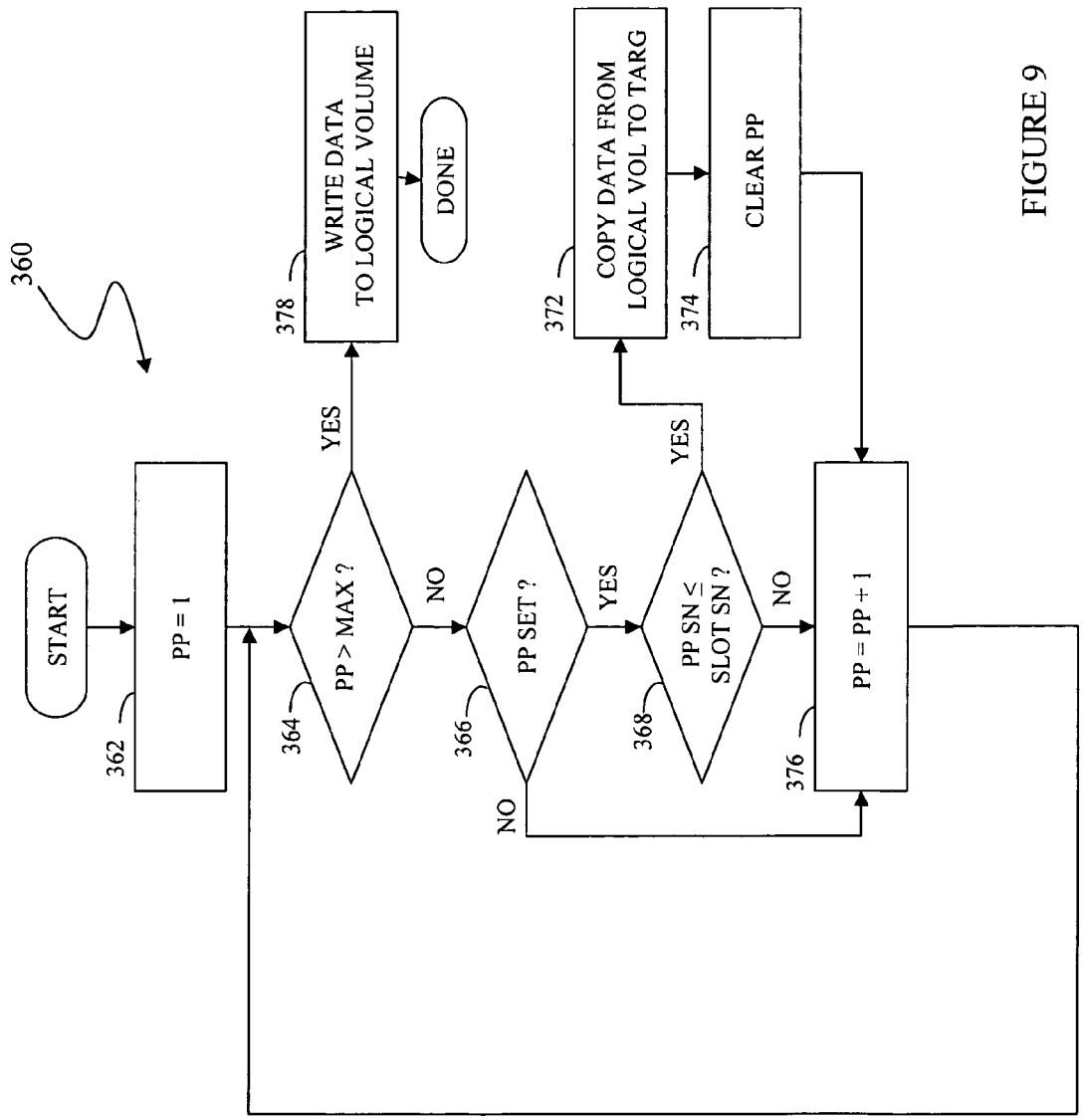
FIG. 9 is a flow chart illustrating steps in connection with an alternative embodiment for handling a write operation after new sessions have been established according to the system described herein.

Referring to FIG. 9, a flow chart 360 illustrates an alternative embodiment for the steps performed in connection with the special write processing step 318 of the flow chart 300 of FIG. 7. Performing the steps illustrated by the flow chart 360 results of a system like that illustrated by the diagram 240 of FIG. 6C, discussed above.

Processing begins at a first step 362 where a pointer, PP, used to iterate through the protection bits (and corresponding sessions) for the track is initialized. Following the step 362 is a test step 364 where it is determined if PP is greater than the maximum value of PP, indicating that the processing has iterated through all of the protection bits. If not, then control transfers from the test step 364 to a test step 366 where it is determined if the protection bit corresponding to the pointer, PP, is set. If so, then control transfers from the test step 366 to a test step 368 where it is determined if the session number value associated with PP is less than or equal to the session number value associated with the slot in the cache memory. As discussed elsewhere herein, each time a new session is established, a session number value is associated with the new session where the session number value equals the latest session number value at the time that the new session is established.

If it is determined at the test step 368 that the session number value associated with the protection bit pointed to by PP is less than or equal to the session number value associated with the slot, then control transfers from the test step 368 to a step 372 where the data is provided from the storage device 102 to the target device(s) for the session corresponding to PP. In an embodiment herein, the data is first copied from the storage device 102 to the cache memory 106 and then destaged from the cache memory 106 to the target device(s).

Following the step 372 is a step 374 where the protection bit corresponding to PP is cleared. Following the step 374 is a step 376 were the pointer, PP, used to iterate through the protection bits is incremented. Note that the step 376 is reached from the step 366 if the protection bit corresponding to PP is not determined to be set at the test step 366. The step 376 is also reached if the slot number value associated with the protection bit corresponding to PP is not less than or equal to the session number value associated with the slot.

Following the step 376, control transfers back to the test step 364 where it is determined if all of the protection bits have been processed. If so, then control transfers from the test step 364 to a step 378 where the data that is being written (e.g., D" in FIGS. 6A and 6C) is written to the logical volume 102. In an embodiment herein, the data is first provided to a scratch slot in the cache memory 106 and then destaged from the cache memory 106 to the logical volume 102. Although writing the data to the logical volume 102 at the step 378 overwrites the data therein (e.g., D in FIGS. 6A and 6C), all targets that were owed the data, D, that was in the logical volume 102 prior to the write operation would have received the data in connection with execution of the step 372, discussed above. Following the step 378, processing is complete.

Figure 10:
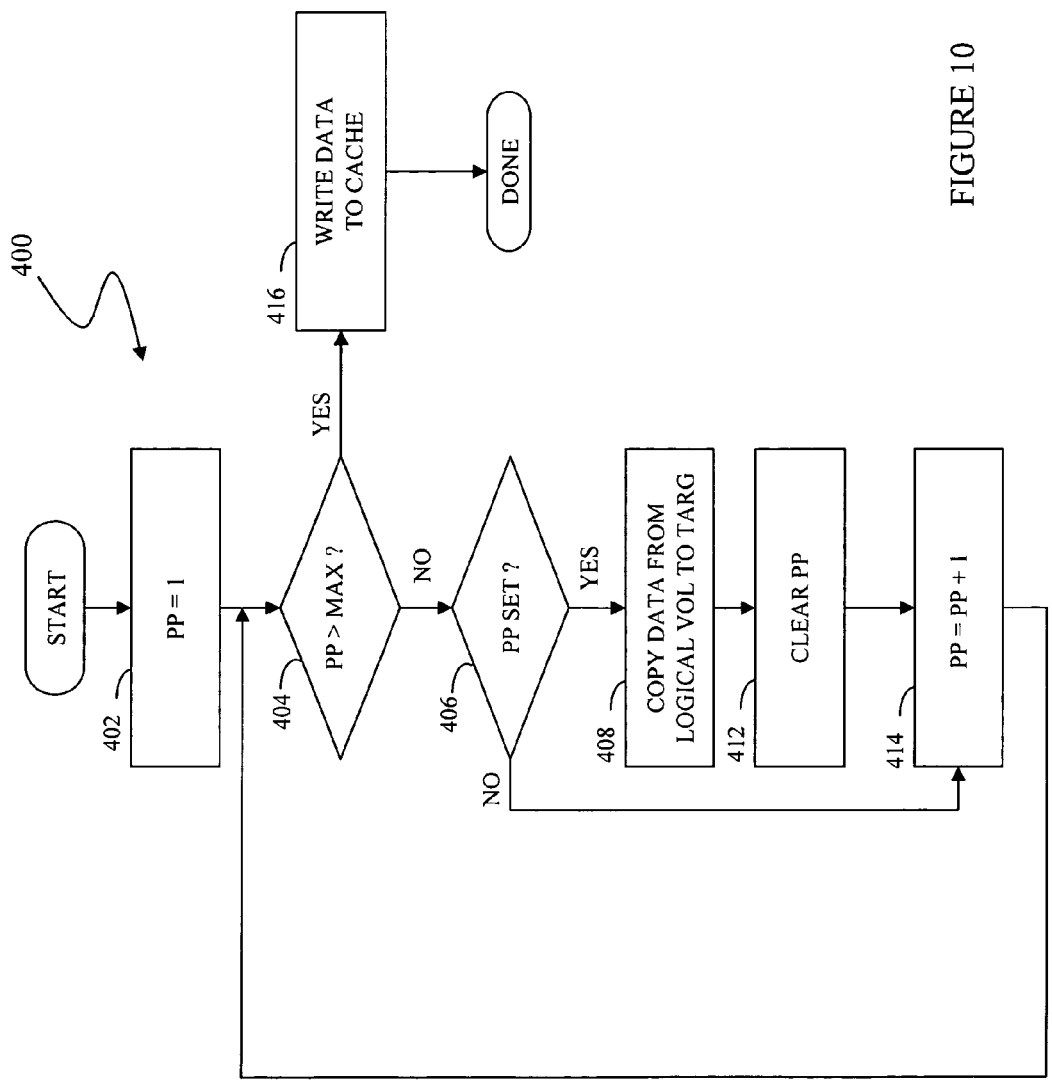
FIG. 10 is a flow chart illustrating steps in connection with handling a subsequent write operation after handling a first write operation when new sessions have been established according to the system described herein.

Referring to FIG. 10, a flow chart 400 illustrates steps performed in connection with transitioning the system from the state illustrated by the diagram 240 of FIG. 6C to the state illustrated by the diagram 250 of FIG. 6D. Processing begins at a first step 402 where a pointer, PP, used to iterate through the protection bits (and corresponding sessions) is initialized. Following the step 402 is a test step 404 where it is determined if PP is greater than the maximum value of PP, indicating that the processing has iterated through all of the protection bits. If not, then control transfers from the test step 404 to a test step 406 where it is determined if the protection bit corresponding to the pointer, PP, is set. If so, then control transfers from the test step 406 to a step 408 where the data is provided from the cache memory 106 to the target device(s) for the session corresponding to PP.

Following the step 408 is a step 412 where the protection bit corresponding to PP is cleared. Following the step 412 is a step 414 where the pointer, PP, used to iterate through the protection bits is incremented. Note that the step 414 is reached from the step 406 if the protection bit corresponding to PP is not determined to be set at the test step 406. Following the step 414, control transfers back to the test step 404 where it is determined if all of the protection bits have been processed. If so, then control transfers from the test step 404 to a step 416 where the data that is being written (e.g., D''' in FIG. 6D) is provided to the cache memory 106. Following the step 416, processing is complete.

Figure 11:
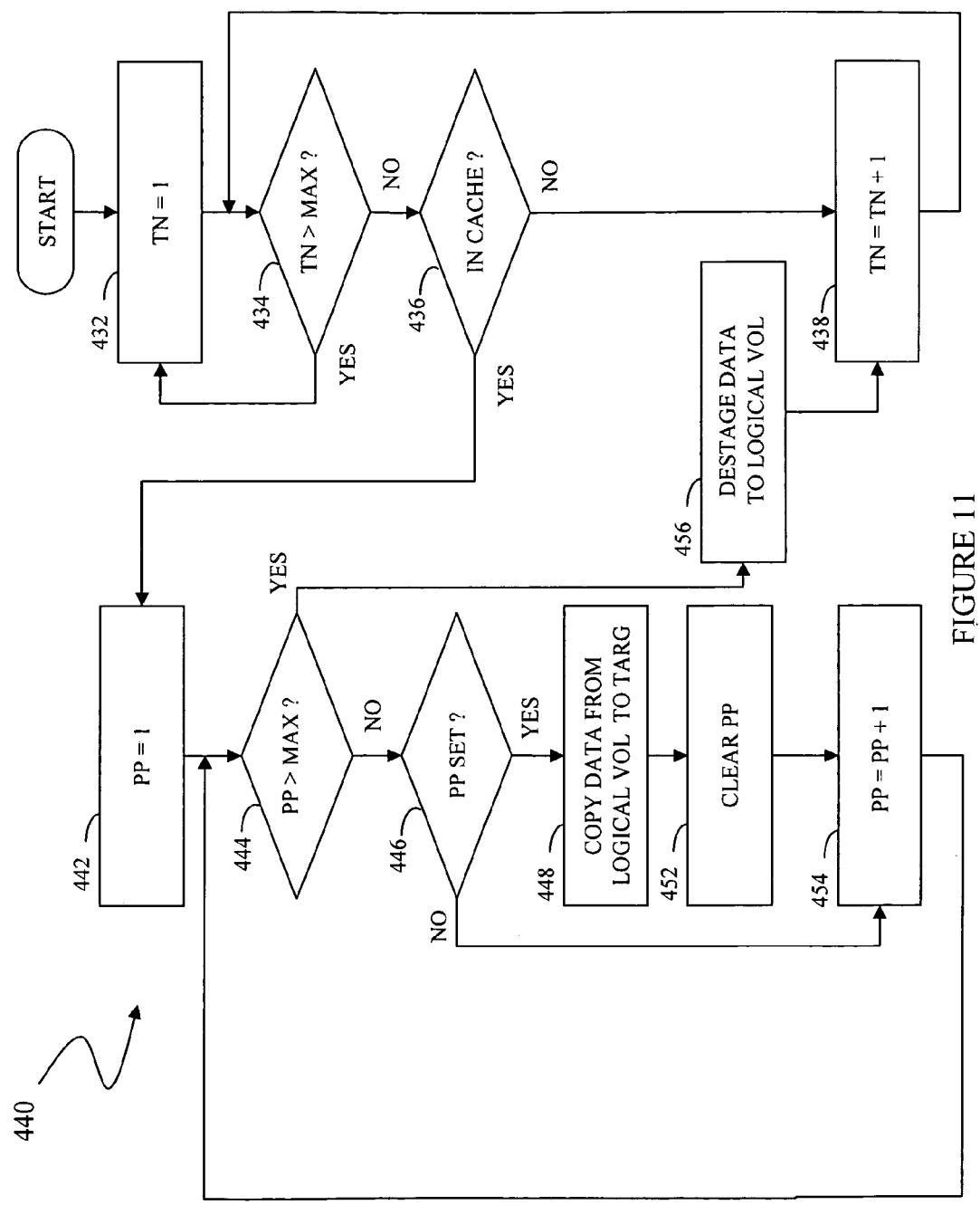
FIG. 11 is a flow chart illustrating steps performed in connection with a background process that destages data from a cache memory according to the system described herein.

Referring to FIG. 11, a flow chart 430 illustrates steps performed in connection with a process that destages data from the cache memory 106 according to the system described herein. Note that destaging may be performed as a background process. In an embodiment herein, the frequency and/or the priority of the destaging process may be made proportional to the number and/or percentage of write pending slots (i.e., the amount of data in the cache memory 106).

Processing begins at a first step 432 where a variable, TN, used to iterate through the tracks of the storage device 102 is initialized. Following the step 432 is a test step 434 where it is determined if all of the tracks of the storage device 102 have been processed. If so, then control transfers from the test step 434 back to the step 432 where the system is reinitialize to begin another iteration to process all the tracks of the storage device 102.

If it is determined at the test step 434 that there are more tracks to be processed, then control transfers from the test step 434 to a test step 436 where it is determined if the data for the track being processed is in the cache memory 106. If not, then control transfers from the test step 436 to a step 438 where the variable TN for iterating through the track is incremented. Following the step 438, control transfers back to the test step 434 to begin another iteration.

If it is determined at the test step 436 that the data for the track being processed is in the cache memory 106, then control transfers from the step 436 to a step 442 where a pointer, PP, used to iterate through the protection bits (and corresponding sessions) is initialized. Following the step 442 is a test step 444 where it is determined if PP is greater than the maximum value of PP, indicating that the processing has iterated through all of the protection bits. If not, then control transfers from the test step 444 to a test step 446 where it is determined if the protection bit corresponding to the pointer, PP, is set. If so, then control transfers from the test step 446 to a step 448 where the data is provided from the logical volume 102 to the target device(s) for the session corresponding to PP. In an embodiment herein, the data is first copied from the logical volume 102 to the cache memory 106 and then destaged from the cache memory 106 to the target device(s).

Following the step 448 is a step 452 where the protection bit corresponding to PP is cleared. In some embodiments, there may be instances where the protection bits are never cleared, in which case the step 452 is not executed. Following the step 452 is a step 454 were the pointer, PP, used to iterate through the protection bits, is incremented. Note that the step 454 is reached from the step 446 if the protection bit corresponding to PP is not determined to be set at the test step 446. Following the step 454, control transfers back to the test step 444 where it is determined if all of the protection bits have been processed. If so, then control transfers from the test step 444 to a step 456 where the data is destaged from the cache memory 106 to the logical volume 102 in a conventional fashion. Following the step 456 is the step 438, discussed above, where the track number variable, TN, is incremented to process the next track.

Figure 12:
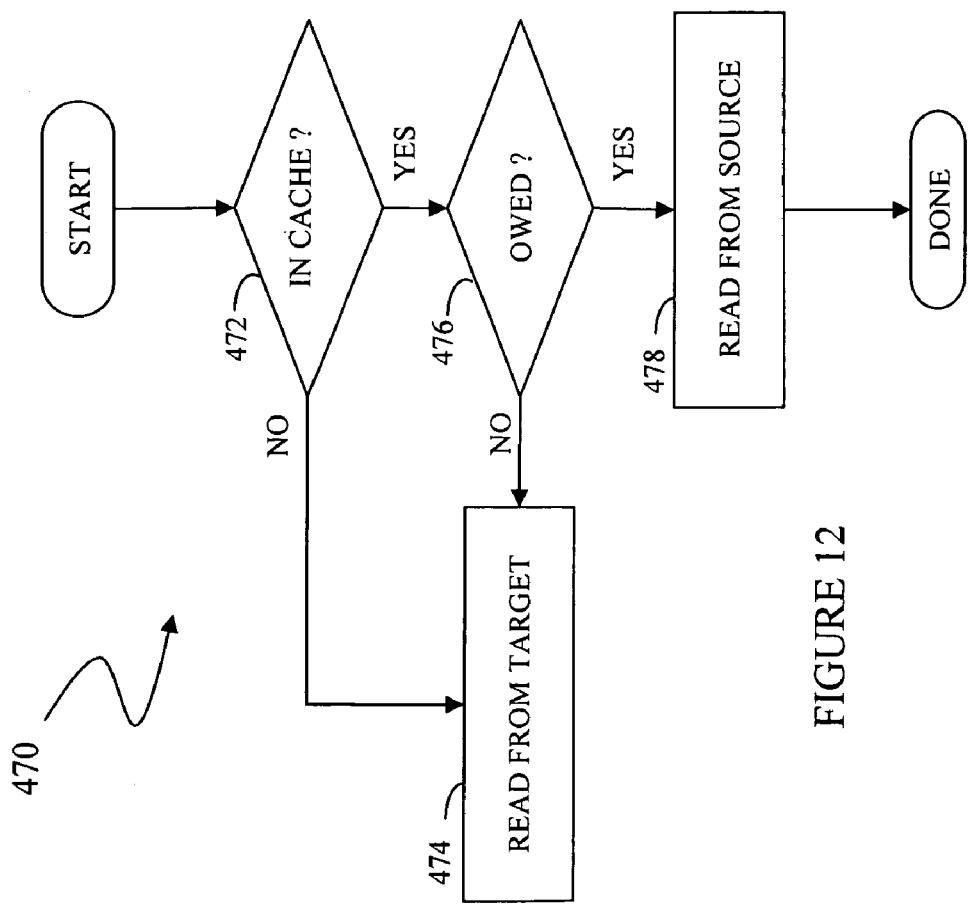
FIG. 12 is a flow chart illustrating reading data from a target device according to the system described herein.

Referring to FIG. 12, a flow chart 470 illustrates steps performed in connection with reading data from a target device. Processing begins at a first test step 472 where it is determined if there is data in the cache memory 106 corresponding to the track of the target device being read. If not, then control transfers from the test step 472 to a step 474 where a normal read from the target device is performed. Following the step 474, processing is complete.

If it is determined at the test step 472 that the desired data from the target device corresponds to data in the cache memory 106, then control transfers from the test step 472 to a test step 476 where it is determined if the target device is owed data from any source (e.g., from the logical volume 102). If not, then control transfers from the test step 476 to the step 474, discussed above, were a normal read from the target device is performed. Otherwise, if it is determined at the test step 476 that the target device is owed data from a source, then control transfers from the test step 476 to a step 478 where the data is read from the source that owes the data to the target device. For example, if the target device is owed data from the logical volume 102, then the data may be read from the logical volume 102 at the step 478 by first reading the data from the logical volume 102 into a scratch slot in the cache memory 106 and then reading the data from the scratch slot. Note also that it is possible at the step 478 for the source to be data in the cache memory 106 in instances where the target device is owed the data from the cache memory 106. Following the step 478, processing is complete.

Figure 13:
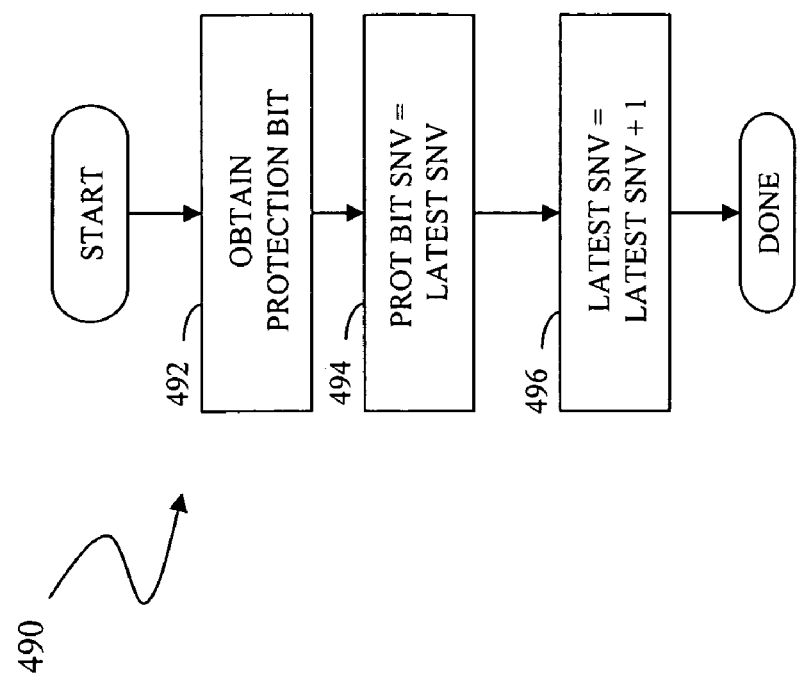
FIG. 13 is a flow chart illustrating establishing a new session according to the system described herein.

Referring to FIG. 13, a flow chart 490 illustrates steps performed in connection with establishing a new session. Processing begins at a first step 492 where a protection bit for the session is obtained. Following step 492 is a step 494 where the session number value for the protection bit (new session) is set equal to the latest session number value. Following the step 494 is a step 496 where the latest session number value is incremented. Following the step 496, processing is complete. Note that, in an alternative embodiment, it is possible to first increment latest session number value (i.e., the step 496) and then perform the remainder of the processing (i.e., the steps 492, 494), in which case, if the latest session number is initialized to zero, the first activated session will have a latest session number of one associated therewith.

Note that the system described herein may tend to increase the amount of data in the cache memory 106. In an embodiment herein, when the amount of data in the cache memory 106 exceeds a predetermined limit, the mechanism described herein may be suspended and may revert to conventional COFW processing. In addition, as mentioned elsewhere herein, it is possible to establish sessions and use protection bits for reasons other than COFW (i.e., mixed sessions). In an embodiment herein, the system reverts to conventional COFW processing whenever there are mixed sessions.

Although the system described herein uses tracks as a unit of data for certain purposes, it should be understood that other units of data (including, possibly, variable length units of data) may be used. This also applies to other data structures and data units. In addition, in some instances, the order of steps in the flow charts may be modified, where appropriate. The system described herein may be implemented using software provided in a computer-readable storage medium. The computer-readable storage medium may be located on at least one of the directors 52a-52c.

While the invention has been disclosed in connection with various embodiments, modifications thereon will be readily apparent to those skilled in the art. Accordingly, the spirit and scope of the invention is set forth in the following claims.

What is claimed is:

1. A method of handling a write operation to write data to a first section of a storage device, comprising:
    determining if the first section needs to be copied to a second section of a first target device; and
    if the first section of the storage device needs to be copied to the second section of the first target device, providing the data to a memory location, different from the first and second sections, and confirming completion of the write operation prior to copying the first section of the storage device to the second section of the first target device.

2. A method, according to claim 1, wherein the memory location is a cache memory.

3. A method, according to claim 1, further comprising:
    determining if a slot in a cache memory corresponding to the first section of the storage device needs to be copied to a third section of a second target device.

4. A method, according to claim 3, wherein, in response to the first section of the storage device needing to be copied to the second section of the first target device and the slot needing to be copied to the third section of the second target device, the slot is copied to the third section of the second target device prior to providing the data to the memory location.

5. A method, according to claim 3, further comprising:
    establishing a first session corresponding to the first target device; and
    establishing a second session corresponding to the second target device.

6. A method, according to claim 5, further comprising:
    associating each of the sessions with a counter indicating a number of sessions that have been established.

7. A method, according to claim 6, wherein determining if a slot in the cache memory corresponds to the first section of the storage device that needs to be copied to the third section of the second target device includes examining the counters associated with each of the sessions.

8. A method, according to claim 7, wherein examining the counters includes determining if a counter associated with a session is less than a counter associated with a slot.

9. A method, according to claim 8, wherein the counter associated with the slot is a value for the number of sessions that had been established when the data was written to the slot.

10. A computer-readable storage medium storing computer software, executable code that is executable by at least one processor, that handles a write operation to write data to a first section of a storage device, the software comprising:
    executable code that determines if the first section needs to be copied to a second section of a first target device; and
    executable code that provides the data to a memory location, different from the first and second sections, and confirms completion of the write operation prior to copying the first section of the storage device to the second section of the first target device if the first section of the storage device needs to be copied to the second section of the first target device.

11. The computer-readable storage medium, according to claim 10, wherein the memory location is a cache memory.

12. The computer-readable storage medium, according to claim 10, further comprising:
    executable code that determines if a slot in a cache memory corresponding to the first section of the storage device needs to be copied to a third section of a second target device.

13. The computer-readable storage medium, according to claim 12, wherein, in response to the first section of the storage device needing to be copied to the second section of the first target device and the slot needing to be copied to the third section of the second target device, the slot is copied to the third section of the second target device prior to providing the data to the memory location.

14. The computer-readable storage medium, according to claim 12, further comprising:
    executable code that establishes a first session corresponding to the first target device;
    executable code that establishes a second session corresponding to the second target device; and
    executable code that associates each of the sessions with a counter indicating a number of sessions that have been established.

15. A storage device, comprising:
    a plurality of interconnected directors, at least some of which provide input and output for the storage device;
    a plurality of disks, coupled to at least some of the directors, the disks containing data for the storage device; and
    a computer-readable storage medium containing software that handles a write operation to write data to a first section of the storage device, the software having executable code that determines if the first section needs to be copied to a second section of a first target device and executable code that provides the data to a memory location, different from the first and second sections, and confirms completion of the write operation prior to copying the first section of the storage device to the second section of the first target device if the first section of the storage device needs to be copied to the second section of the first target device.

16. A storage device, according to claim 15, wherein the memory location is a cache memory.

17. A storage device, according to claim 15, wherein the software also includes executable code that determines if a slot in a cache memory corresponding to the first section of the storage device needs to be copied to a third section of a second target device.

18. A storage device, according to claim 17, wherein, in response to the first section of the storage device needing to be copied to the second section of the first target device and the slot needing to be copied to the third section of the second target device, the slot is copied to the third section of the second target device prior to providing the data to the memory location.

19. A storage device, according to claim 17, wherein the software also includes executable code that establishes a first session corresponding to the first target device and executable code that establishes a second session corresponding to the second target device.

20. A storage device, according to claim 19, wherein the software also includes executable code that associates each of the sessions with a counter indicating a number of sessions that have been established.

* * * * *

UNITED STATES PATENT AND TRADEMARK OFFICE
CERTIFICATE OF CORRECTION

PATENT NO. : 7,617,372 B1
APPLICATION NO. : 11/528767
DATED : November 10, 2009
INVENTOR(S) : Bjornsson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Nineteenth Day of October, 2010

David J. Kappos
*Director of the United States Patent and Trademark Office*